United States Patent [19]

Willett

[11] Patent Number: 4,789,826

[45] Date of Patent: Dec. 6, 1988

[54] SYSTEM FOR SENSING THE ANGULAR POSITION OF A ROTATABLE MEMBER USING A HALL EFFECT TRANSDUCER

[75] Inventor: Michael D. Willett, Colorado Springs, Colo.

[73] Assignee: Ampex Corporation, Redwood City, Calif.

[21] Appl. No.: 27,753

[22] Filed: Mar. 19, 1987

[51] Int. Cl.⁴ .................. G01B 7/14; G01N 27/72; G01R 33/02; H01L 43/06

[52] U.S. Cl. .................. 324/208; 324/225; 324/252; 338/32 H

[58] Field of Search ............ 324/207, 208, 225, 235, 324/251, 252; 338/32 R, 32 H; 307/309; 323/368; 335/205; 360/74.3

[56] References Cited

U.S. PATENT DOCUMENTS 4,371,836  1/1983  Sieverin .................. 324/251
4,540,964  9/1985  Blecke .................. 338/32 H Primary Examiner—Reinhard J. Eisenzopf
Assistant Examiner—Walter E. Snow
Attorney, Agent, or Firm—George B. Almeida; Richard P. Lange

[57] ABSTRACT

Angular rotation of a member, such as the shaft of a tension arm assembly, is sensed by the combination of a circular type of magnet secured to the rotatable member and selectively polarized relative to its diameter to define a magnetic north-south pole pair, and a stationary Hall Effect transducing device secured in close and constant proximity to the ring magnet. A circuit coupled to the transducing device includes offset and amplification stages. In a preferred embodiment, the Hall Effect transducing device is located in the region of a magnetic null of the field generated by the magnetic poles, when the rotatable member is in a selected angular position. The constant gap between the transducing device and the circular magnet optimizes the generation of a linear output via the circuit, to accurately sense the member rotation.

10 Claims, 5 Drawing Sheets

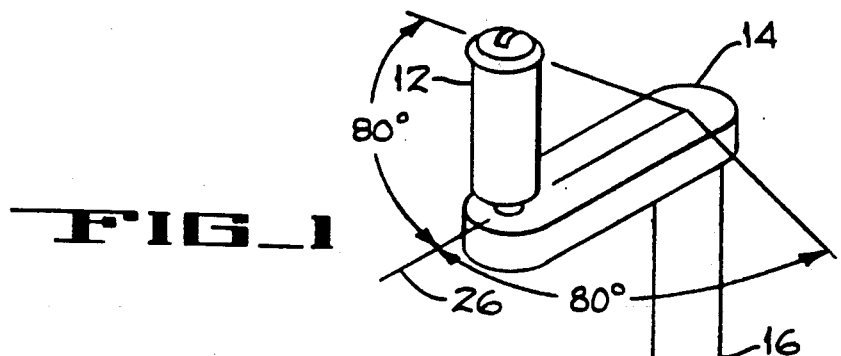
FIG_1
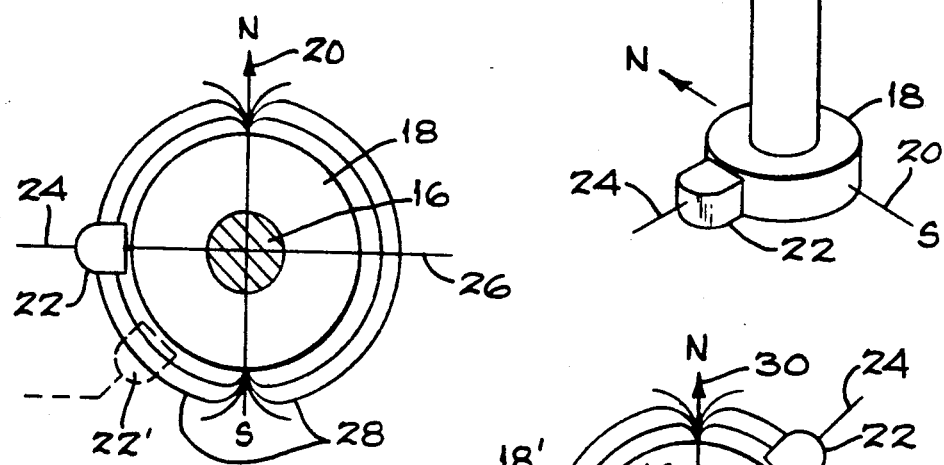
FIG_2
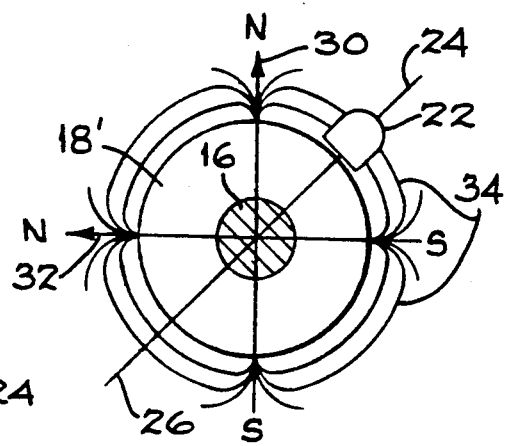
FIG_3
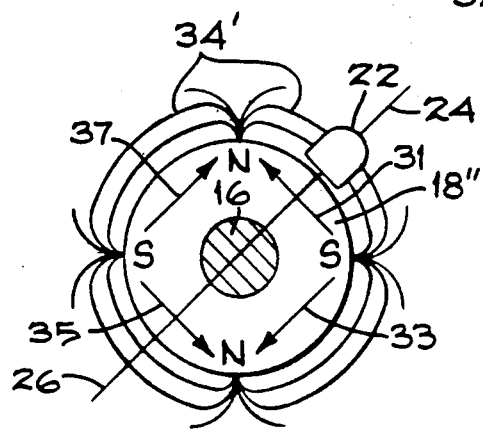
FIG_4

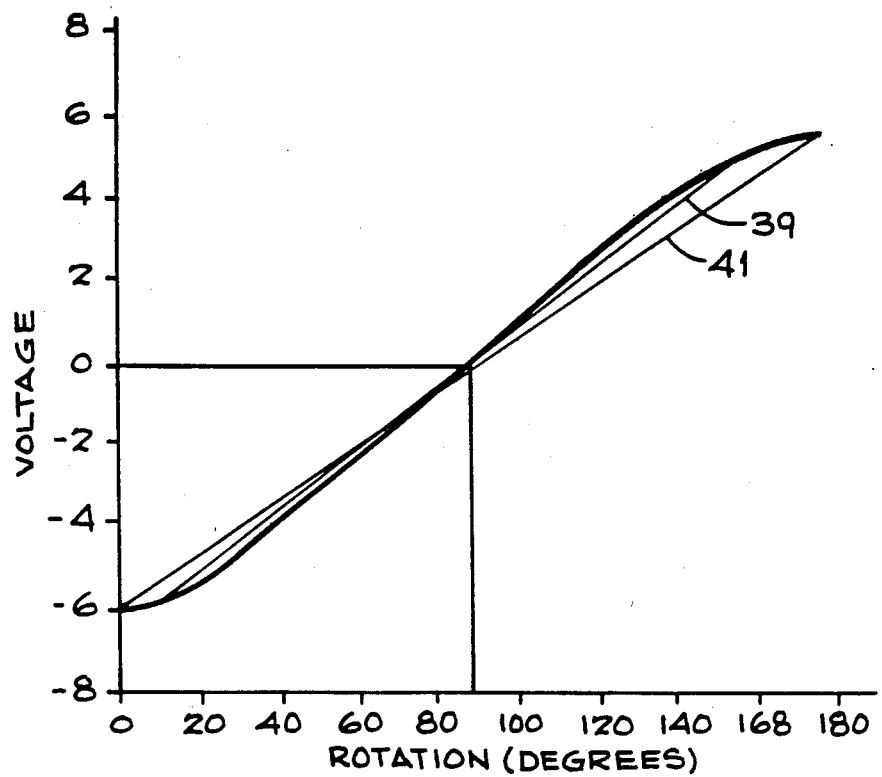
FIG_5
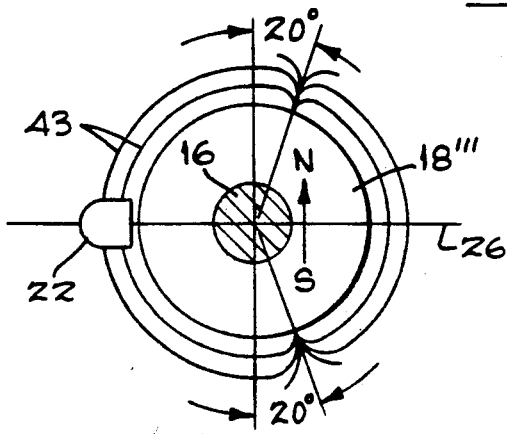
FIG_6
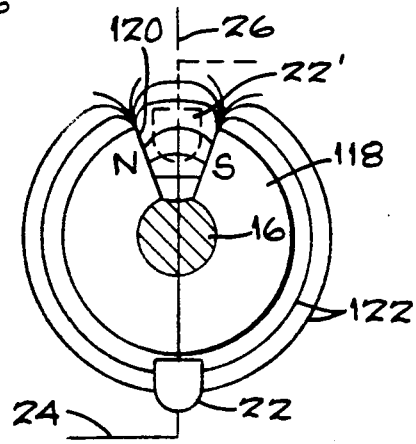
FIG_7

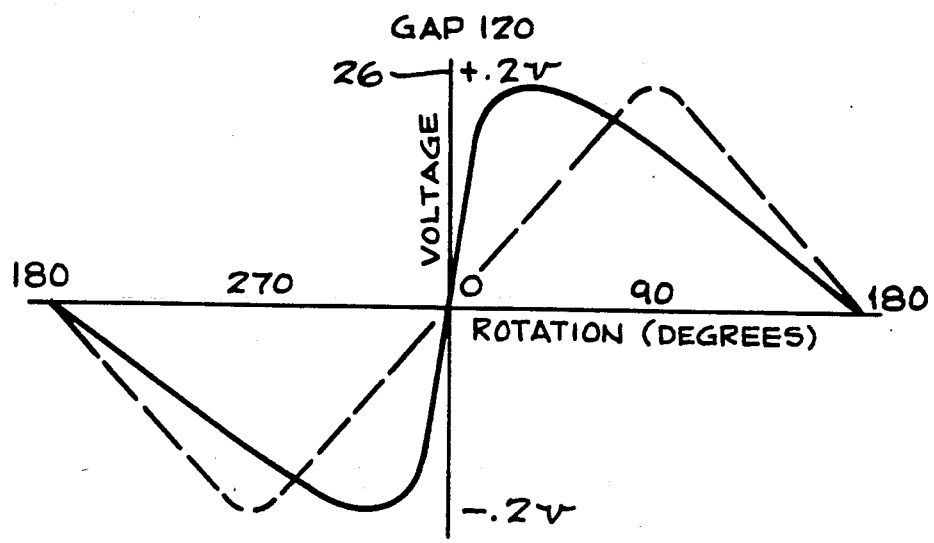
FIG_8
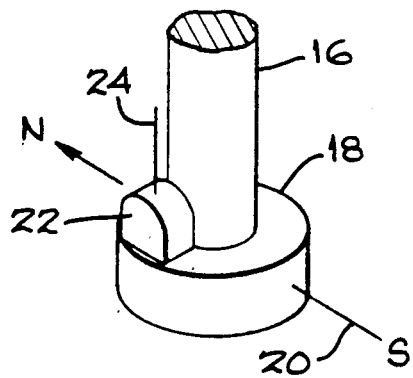
FIG_11
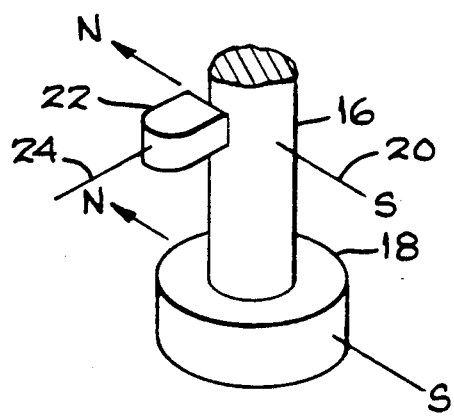
FIG_12

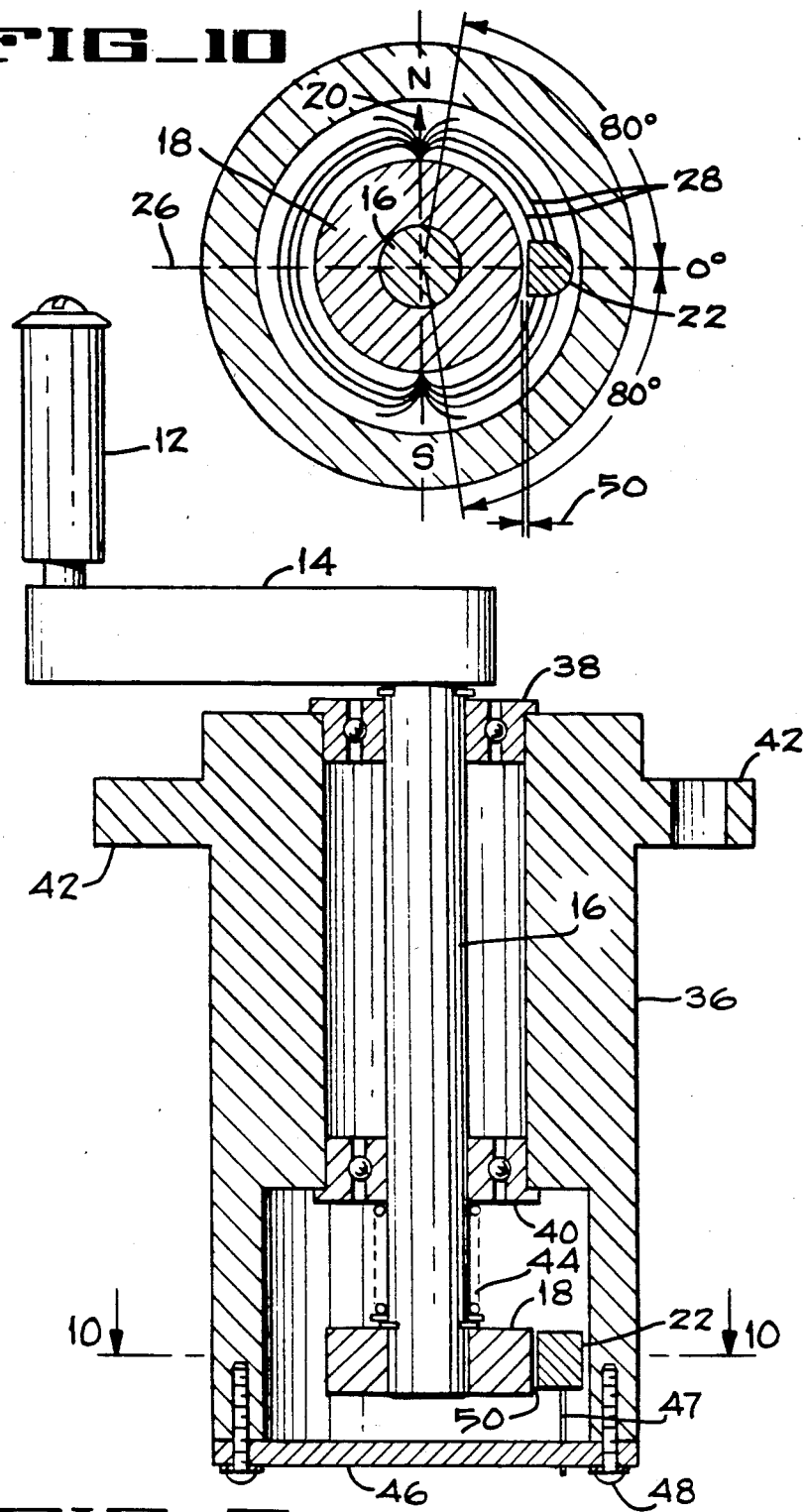

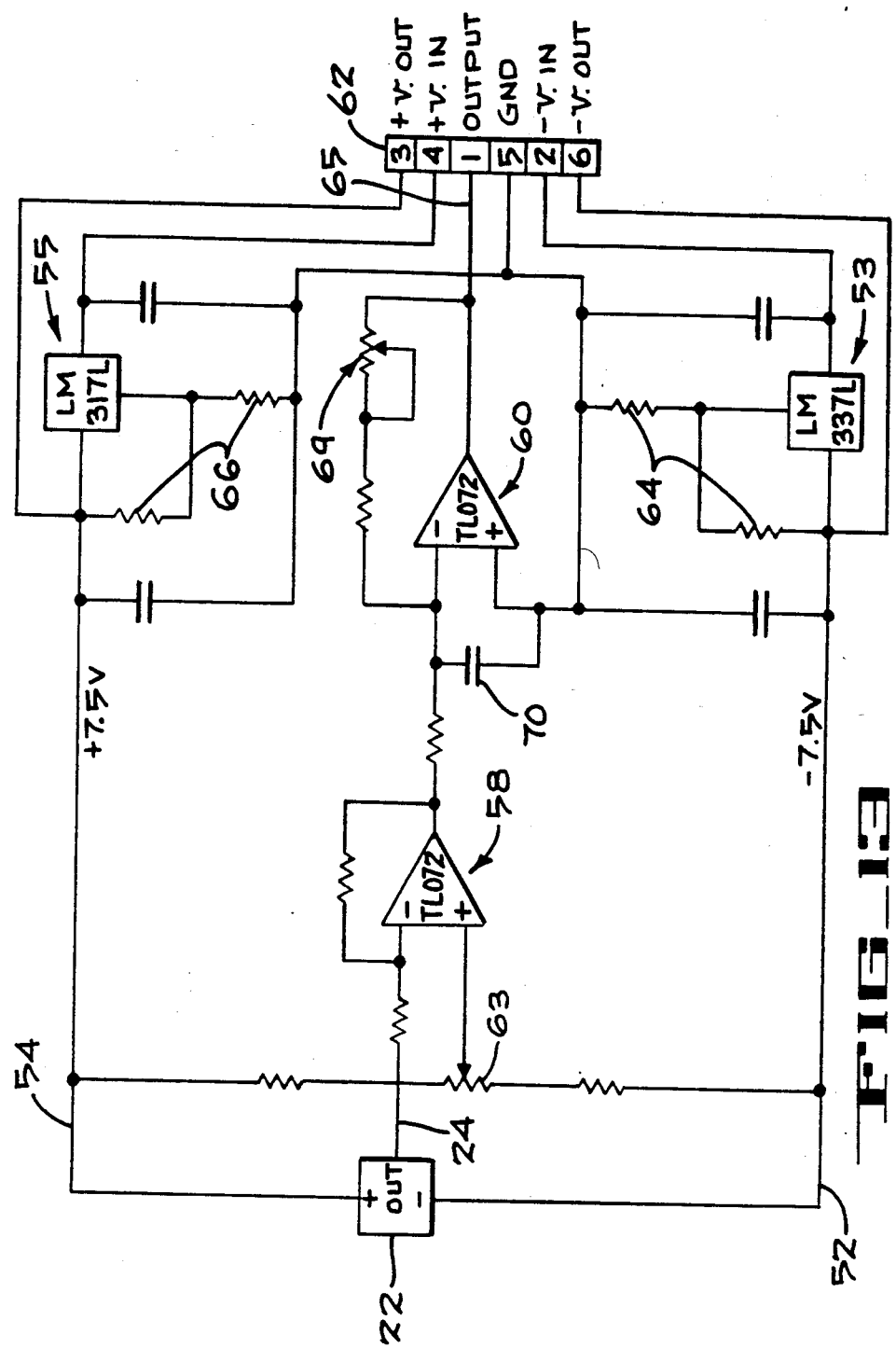
FIG_13

SYSTEM FOR SENSING THE ANGULAR POSITION OF A ROTATABLE MEMBER USING A HALL EFFECT TRANSDUCER

SUMMARY AND BACKGROUND OF THE INVENTION

The present invention relates to angular position sensing transducers and in particular to a tape tension arm position sensing transducer preferably employing a Hall Effect device.

In the field of television, sophisticated broadcast videotape recorders utilize a tape tension arm in the magnetic tape path, to control the tape tension during the process of recording and reproducing magnetic history on the tape. In such situations, the position of the tension arm, that is, the rotation of the tension arm through preselected varying angles as it bears against the tape, is transduced to a voltage and supplied as one input to servo circuitry which controls the tension applied to the tape. Thus, sensing the position of the tension arm as defined in terms of voltage, provides a relative indication of the tension in the tape. Since tape tension is one parameter which is directly related to the accuracy of recording and reproducing magnetic history on tape, it is highly desirable that the position sensing transducer be very accurate, preferably supply a very linear voltage output relative to the angular position, and be temperature insensitive. In addition, it is highly desirable that the tension arm sensor be simple, readily manufactured and assembled, and mechanically and electrically reliable in its operating environment.

There are various types of tension arm position sensing transducers available at present for use, for example, in videotape recorders. Predominant among such devices is a photo potentiometer transducer which senses the relative angular position of the tension arm employing a light emitting diode (LED). The LED directs light through a mask having an opening of preselected shape, and thence into a photo-resistive potentiometer sensor. As the tension arm rotates, a correspondingly varied amount of light is passed by the mask and a photoresistor generates an output voltage which thus varies in proportion to the degree of rotation. Although widely used, such a photo potentiometer transducer necessitates the use of electric wires which extend from the sensing device to the sending device (LED) mounted on a printed wiring assembly. Since the LED is mounted on the rotatable shaft, the connecting wires cause drag which, in turn, causes corresponding errors in the output voltage which represents the angular position of the shaft. In addition, due to the characteristics of the photo potentiometer transducer, the generated output inherently is relatively non-linear, which also causes errors in the output voltage. The transducer further has the disadvantage of failing to provide consistently accurate readings under actual operating conditions in the tape recorder due to changing or inconsistent linearity characteristics of the photoresistor within the photo potentiometer which, in turn, deteriorates the accuracy of the associated servo circuit.

A second type of angular position sensing transducer employs a magneto-resistive transducing device, wherein rotation is translated into an output voltage via changes in resistance of the device caused by movement of a magnetic field. These transducers are very temperature sensitive and, due to their configuration, require sophisticated mounting within their respective supporting housing. The complexity in mounting the magneto restrictive transducer is exemplified by the difficulty in aligning the separate shaft, required in the device which performs the sensing, with the shaft whose rotation is being sensed. The transducer is not self-contained and therefore adds undesirable length to the assembly, whereby the added complexity in the supporting housing is reflected as additional costs in manufacture and assembly.

A third type of angular position sensing transducer utilizes a Hall Effect device in conjunction with a magnet for supplying a selected magnetic field. Such transducers provide selected advantages over the previous types of transducers mentioned above. However, the Hall Effect transducers presently available have configurations which inherently contain various disadvantages. For example, the transducers sense rotation of a member by utilizing a varying air gap to achieve varying flux densities. The Hall Effect device senses the varying flux density and generates a voltage proportional to the rotation of the member. However, the resulting voltage generated by this configuration may be relatively non-linear throughout the angle of rotation which is being measured due to the varying air gap configuration employed.

The present invention overcomes the disadvantages of the angular position sensing transducers of previous mention, while providing a Hall Effect transducer which further overcomes the disadvantages of Hall Effect transducers presently available. To this end, the invention provides a relatively simple configuration which readily is mounted as a self contained unit in, for example, an existing supporting housing of a videotape recorder tension arm structure, and which further provides a very linear output voltage over the entire angular rotation of the tape tension arm. In addition, the invention is temperature insensitive and, due to its simplicity, is very reliable. In turn, the transducer is readily manufactured and is easily assembled within, or added as a retrofit assembly to, for example, a videotape recorder.

To this end, in a preferred embodiment, the invention utilizes a Hall Effect device and magnet coupled to a tape tension arm shaft, in combination with an offset compensated, voltage regulated, amplifying electronic circuit. The shaft of a conventional tension arm is mounted within a housing, and a ring magnet, selectively polarized relative to the circular configuration thereof, is coaxially secured at the end of, or along the length of, the shaft for rotation therewith. The Hall Effect device is secured as by the housing in adjacent proximity to the rotatable ring magnet to provide a preselected constant gap between the Hall Effect device and the circumference of the ring magnet throughout the possible rotation of the shaft. The close and constant proximity of the Hall Effect device relative to the ring magnet optimizes the magnetic field seen by the Hall Effect device, and thus optimizes the linear voltage output. For example, in a preferred embodiment using a ring magnet polarized across the diameter to define poles spaced 180° apart, the rotation may approach ±80 degrees from a zero or null position corresponding to a center position of the rotatable tension arm. To further optimize the output voltage linearity, the Hall Effect device preferably is located midway relative to the orientation of the magnetic poles of the magnet, that is, is located substantially at the magnetic null generated by the north-south poles, when the tension arm is in its center position. Thus voltage variations indicative of ring magnet rotation are caused by movement of the pole pair relative to the Hall Effect device, rather than by a flux density change such as caused by varying the air gap.

The Hall Effect device herein is supplied with a regulated voltage, and the output voltage therefrom is supplied to an offset operational amplifier which provides adjustment for setting the voltage to a selected nulled voltage, for example, to zero, when the tension arm is in its center position. A second operational amplifier is coupled to the offset operational amplifier and suitably amplifies the output signal for subsequent use in the associated servo circuit.

BRIEF DESCRIPTION OF THE DRAWINGS

FIG. 1 is a simplified perspective view of a basic implementation of the invention.

FIG. 2 is a simplified view of a portion of the device shown in FIG. 1, depicting an orientation of the Hall Effect device relative to the magnetic field generated by a single pole pair ring magnet.

FIGS. 3 and 4 are further simplified views of the orientation of the Hall Effect device relative to the magnetic field generated by double pole pair ring magnets.

FIG. 5 is a graph of voltage versus angular rotation, which illustrates the linearity of the invention transducer exemplified in FIGS. 1, 2.

FIGS. 6 and 7 are simplified views of alternative embodiments of the ring magnet, including the relative Hall Effect device positions.

FIG. 8 is a graph of voltage versus angular rotation generated by the alternative "C" shaped ring magnet of FIG. 7.

FIG. 9 is a cross-sectional view of the inventive Hall Effect transducer in the environment of a tape tension arm assembly.

FIG. 10 is a cross-section view taken along the section line 10—10 of FIG. 9.

FIGS. 11 and 12 are simplified perspective views depicting alternative locations for the Hall Effect device relative to the ring magnet and rotatable member.

FIG. 13 is a schematic diagram exemplifying the offset, amplifying, and voltage regulation circuitry of the invention.

DESCRIPTION OF THE PREFERRED EMBODIMENTS

Referring to FIG. 1, a simplified tape tension arm assembly is depicted, including a tape roller guide 12, a tension arm 14 and a tension arm shaft 16. In accordance with the invention, a ring magnet 18 is secured in coaxial relation to the end of the shaft 16 as, for example, by press fitting, or by any other suitable means. The ring magnet 18 depicted is a single pole pair ring magnet having a north-south (N-S) pole pair which generates accordingly a magnetic field depicted via the arrow 20. A Hall Effect device 22 having a voltage output line 24, is secured to a housing (FIGS. 9, 10) in close proximity to the circumference of the ring magnet 18, and on a radius of the magnet which extends generally perpendicularly to the N-S magnet field 20. Thus, the Hall Effect device 22 is located generally perpendicular to the N-S pole pair, that is, is located at a midway point corresponding to the magnetic field null, when the tape tension arm assembly is in the center position depicted herein by a line 26. In theory, the position corresponds to a nulled (preferably zero) voltage output from the Hall Effect device 22. In practice, the center position corresponds to a nulled voltage output of one-half of the supply voltage plus-or-minus the offset errors of the Hall Effect device, thereby necessitating an offset stage further described in FIG. 13. In a practical tape transport application, the guide 12/arm 14, and thus the shaft 16, rotate together through an angle of the order of ±30 degrees relative to the center position 26. However, as depicted in the FIG. 1, the transducer may be used at greater angular rotations of the order of ±80° depending upon the desired application and the corresponding configuration, as further described below.

FIG. 2 further illustrates the magnetic field lines of flux, as at numeral 28, which are generated by the single pole pair ring magnet 18, and further shows the orientation of the fixed Hall Effect device 22 relative to the flux lines, along the position 26 corresponding to the center position of the tension arm 14. Accordingly, the Hall Effect device 22 is located at a position which is generally perpendicular to the magnetic field 20 and at the magnetic null of the N-S pole pair. However, as depicted in broken line the magnetic field transducing device, such as the Hall Effect device 22, may be located in the magnetic field lines of flux in a region thereof which is displaced from the magnetic null. The latter configuration is useful in situations where a rotatable member rotates primarily in one direction relative to a center position, or slightly in one direction and more extensively in the other direction.

FIG. 3 illustrates another embodiment of the invention wherein similar components are similarly numbered. A double pole pair ring magnet 18' is used in place of the single pole pair ring magnet 18 of previous description. The resulting pair of N-S magnetic fields are depicted by numerals 30, 32, and generate a pattern corresponding to a double pair of flux lines as depicted by numeral 34. The Hall Effect device 22 herein is fixed in close proximity to the circumference of the ring magnet 18', at a position on a radius thereof which generally is 45 degrees relative to, but still midway between, adjacent N-S poles 30, 32 and along the center position of the tension arm 14 depicted by line 26. The device 22 may be disposed between other pairs of adjacent poles, and either in the magnetic null region, or displaced from the null region, as described in FIG. 2.

FIG. 4 depicts a double pole pair ring magnet 18", wherein the magnet has been magnetized with alternate north-south-north-south poles at successive 90° points around the magnet. The magnetic flux lines 34' essentially are similar to those of FIG. 3, but wherein the N-S magnetic fields 31, 33, 35 and 37 lie within the annulus of the magnet. As may be seen, Hall Effect device 22 lies generally perpendicular to field 31 in the depicted configuration, but may be disposed between other adjacent poles.

The graph of FIG. 5 illustrates the voltage generated by the Hall Effect transducer on the output connector (FIG. 13), utilizing the single pole pair configuration of FIGS. 1, 2 through a rotation of, for example, approximately 180°. In the plot, a zero voltage corresponding to the center position of the tension arm 14 is generated at about 90°. Angular rotation to 0° generates about −6 volts, while angular rotation to 180° generates a voltage of about +6 volts; ergo, the graph depicts the voltage output indicative of the order of ±90° angular rotation of the tension arm 14 about the center position 26 of previous discussion. As may be seen, the voltage output of the Hall Effect device 22 is particularly linear throughout the angular rotation of ±70° as depicted by comparison with the straight line 39, and is still relatively linear over a rotation of ±80° as shown by comparison with the straight line 41. In the double pole pair configuration of FIGS. 3, 4, the linearity of the output voltage drops out somewhat at either extreme of a ±30° angular rotation, when compared to the linearity of the voltage generated by the single pole pair ring magnet of FIGS. 1, 2.

Referring to FIG. 6, an alternative ring magnet 18''' emodiment is illustrated, which is provided by selecting the angular location of the north and south magnetic poles generated in the magnet at the time the latter is manufactured. Thus, as exemplified in FIG. 6, the N-S poles may be induced within the ring magnet at symmetrical locations lying, for example 20° from a diameter, whereby the resulting pattern of magnetic field flux lines 43 extend an arcuate length about the magnet circumference of greater than 180°. This allows a greater range of angular rotation of the magnet 18''' relative to the Hall Effect device 22, while still optimizing the linearity of the output signal from the Hall Effect device 22. Obviously, the invention contemplates the use of other N-S magnetic pole orientations commensurate with other values of angles.

To illustrate, FIG. 7 depicts a further interrupted-ring magnet configuration, herein defined as a "C" shaped ring magnet 118. The magnet 118 has the same general circular configuration and may readily replace the ring magnets of FIGS. 2-4 and 6. However, magnet 118 has a slice or wedge cut out of its cross section to form thereby a gap 120 which interrupts the continuity of the material of the magnet. The magnet 118 is magnetized to provide a north pole at one end of the magnetic material and a south pole at the other end, with the north-south poles at opposite sides of gap 120. The resulting magnetic field is depicted as a circular field 122 originating at the north-south poles and extending generally concentrically about the magnet 118. Concentrated lines of force extend through the gap 120, while a magnetic field null occurs at the point diametrically opposed to the gap, as well as in the gap itself.

The magnet 118 is secured to the tension arm shaft 16 with the gap 120 bisected by the line 26 corresponding to the center position of the tension arm 14 of previous discussion. The Hall Effect device 22 is secured in fixed position along the line 26 in close and constant proximity to the circumference of the ring magnet 118 as previously described. It may be seen that, due to the presence of the gap 120 and the arrangement of the north-south poles at the gap, there is a relatively greater arcuate length of uninterrupted, magnetic flux lines available within which the Hall Effect device may be maintained. It follows that, as in FIG. 6, a greater rotation of the shaft/magnet 118 is possible, while still allowing the Hall Effect device 22 to generate a linear voltage output signal on the line 24. As previously mentioned, the Hall Effect device may be displaced from the magnetic null region. Furthermore, the device 22 may be disposed in the magnetic field lines of flux generated in the gap 120, as depicted in dashed lines.

FIG. 8 illustrates in solid line the theoretical output signal generated by the Hall Effect device 22 given the offset pole configuration of FIG. 6, or the "C" shaped interrupted-ring magnet 118 of FIG. 7. At the gap 120 there are two rapid reversals of magnet field polarities, with a relatively linear region of rotation corresponding generally to from 60° through 300°. The magnetic field null occurs at the 180° point, as well as the zero degree point, with a reversal of polarity. It may be seen that in the gap 120 region, a very small angular rotation provides a relatively large voltage change. Thus securing the Hall Effect device 22 in the gap 120 provides a rotation sensor apparatus of correspondingly high resolution.

By way of comparison, the output signal of FIG. 5 generated by the Hall Effect device 22 of the FIGS. 1, 2 embodiment also is illustrated in FIG. 8 by the dashed curve, over a full rotation of 360°. As depicted in the dashed curve, at a 180° angular position of the magnet 18, the Hall Effect device 22 is at a magnetic null, with a phase reversal. At 270°, the south pole passes the device 22 to provide the largest negative voltage, and at 360° (or 0°) there is an opposite phase reversal at the second magnetic null. At 90°, the north pole passes the Hall Effect device to provide the greatest positive voltage output.

FIGS. 9, 10 depict an implementation of the present Hall Effect transducer in combination with, for example, a tape tension arm assembly, wherein similar components of the previous figures are similarly numbered. The tension arm shaft 16 is rotatably mounted within a housing 36 by means of a pair of spaced-apart bearings 38, 40. The housing includes mounting flanges 42 for securing the assembly and transducer within the associated videotape recorder structure. In this embodiment, the end of the shaft 16 extends beyond bearing 40 within the end of the housing 36. The ring magnet 18 (or an alternative) of previous mention is pressed, or otherwise secured, to the end of the shaft 16 in coaxial arrangement. A spring 44 is disposed in compression between the bearing 40 and the ring magnet 18 to maintain the ring magnet in axial position relative to the Hall Effect device. The Hall Effect device 22 of previous mention is secured, for example, to a circuit board 46 by a suitable rigid support 47, which may be the leads of the device 22. The circuit board 46, in turn, is demountably secured as by suitable screws 48 to the end of the housing 36. The circuit board 46 contains the transducer electronics (FIG. 13) as well as the Hall Effect device 22, thus providing a self-contained transducer unit which readily can be assembled to the tension arm assembly, or which can be removed if repairs or replacement are required. The Hall Effect device 22 is secured to the board 46 by the rigid support 47 which maintains the device 22 in close proximity to the circumference of the ring magnet 18. Thus, a constant gap 50 is maintained between the circumference and the device 22 throughout the full extent of angular rotation of the ring magnet 18, that is, of the tension arm 14. By way of example, the width of the gap 50 may be of the order of almost touching the ring magnet to about one-eighth of an inch. The Hall Effect device 22, in effect, is secured along a radius depicted by the line 26 as the center position (FIG. 10), which corresponds to the center position of the tension arm assembly of previous mention. The magnetic field generated by the single pole pair ring magnet 18 of FIG. 10 is illustrated at numeral 28 whereby, in the preferred embodiment, the Hall Effect device 22 is disposed within the field at a position generally midway between the N-S poles at the magnetic null thereof.

Thus, it may be seen that voltage variations at the output of the Hall effect device in the various embodiments are caused, in essence, by providing movement between the N-S pole pair and the Hall Effect device while maintaining the constant gap of previous mention. It follows that the Hall Effect device senses a change in the polarization of the field, rather than a change in flux density or field strength.

As illustrated in FIG. 11, it is to be understood that the Hall Effect device 22 also may be secured at a location immediately below, or above, the outermost side portion of the various configurations of ring magnets, rather than adjacent to the circumference. In addition, as illustrated in FIG. 12, if the shaft 16 is made of magnetically conductive material, the Hall Effect device 22 may be disposed in close proximity to the circumference of the shaft 16 itself. In this configuration, the N-S magnetic field 20 further is induced in the shaft 16 by the ring magnet 18, and is sensed by the Hall Effect device 22.

In FIG. 13, the Hall Effect device 22 is depicted in combination with an associated electronic circuit, and includes a temperature compensated Hall Effect device, such as a TL3103C manufactured by Texas Instruments. A first input is coupled to a line 52 extending from a voltage regulator 53, and a second input is coupled to a line 54 extending from a voltage regulator 55. Accordingly, by way of example only, the lines 52, 54 supply regulated voltages of the order of −7.5 volts and +7.5 volts, respectively. An output voltage is provided on the line 24 of previous mention, which output is set at approximately zero volts when the tension arm assembly is at its center position and the Hall Effect device 22 essentially is midway to, or at the magnetic null of, the N-S pole pair, as previously described. Any angular rotation of the shaft 16 and thus of the ring nagnet 18, causes a corresponding change in the position of the N-S field poles relative to the stationary Hall Effect device 22 which, in turn, causes the device to generate a corresponding change in output voltage on the output line 24. The line 24 is coupled to the inverting input of an offset operational amplifier (op amp) stage 58 which, for example, allows the circuit to be adjusted to a selected nulled voltage (for example, zero volts). Thus, a zero volt output is supplied by the circuit when the tension arm assembly is in the center position of previous mention. The output of the offset op amp stage 58 is coupled to an inverting input of an amplifying operational amplifier (op amp) stage 60. Since the full voltage range generated by the Hall Efffect device may vary through on the order of only ±0.2 volt, the amplifying op amp stage 60 herein provides sufficient gain to supply a ±5 volt output from the circuit of FIG. 13. Offset adjustment is provided by a variable potentiometer 63 and gain adjustment by the variable potentiometer 69. An output connector 62 of op amp stage 60 supplies the output voltage on a line 65 which is indicative of the angular rotation of the ring magnet 18 and thus of the tension arm 14. A negative voltage change depicts rotation in a first angular direction, and a positive voltage change depicts rotation in the other angular direction.

It may be seen that the Hall Effect device 22 herein is placed across the two power supplies 53, 55 and the lines 52, 54, instead of being placed across a positive power supply and ground. Although the latter configuration is acceptable when a regulated power source with desired offset adjustment is available, in situations where an unregulated power source is used and/or wherein insufficient voltage is available across a single power supply, it is preferable to use the circuit configuration of FIG. 13. This eliminates the problem of an unregulated voltage being supplied to the device 22, which would cause voltage variations in the transducer output on line 65 and reel jitter in the reel servo.

The voltage regulators 53, 55 are an adjustable type which may be set by respective resistors 64 and 66, to supply the voltages of positive and negative 7.5 volts DC on the lines 52, 54. A capacitor 70 on the input of the amplifying op amp stage 60 allows the RD time constant of the circuit to be adapted to emulate the frequency response of tension arm apparatus which is being used for example, in a videotape recorder, or wherein the Hall Effect transducer unit is being retrofitted into the recorder in place of, for example, a photo potentiometer type of tension arm transducer. The capacitor 70 allows rolling off the usual high frequency response of about 100 kiloHertz of the Hall Effect device, to match the lower response of, for example, an original photo potentiometer transducer. Thus, the circuitry of FIG. 13 readily is adapted for use in existing tension arm apparatus in a videotape recorder environment, wherein it is desirable to replace an original tape tension arm position sensing transducer without having to redesign the recorder electronics. In these situations the electronic circuit voltages, offset voltage, etc., readily are matched to the existing or available voltages in the recorder.

The circuit has been described herein with ±7.5 volts applied to the Hall Effect device, with substantially a zero volt output at the center position, by way of example only. The Hall Effect device may be connected across other available voltage ranges such as from ground potential to +12 volts, whereby the output theoretically will be 6 volts. In this situation, as the ring magnet is rotated through ±70°, the output voltage of the Hall Effect device may vary over the range of, for example, 5.8 through 6.2 volts. The resistor values of the offset op amp stage 58 here are selected to provide an offset compensated, nulled voltage (preferably zero volts) when the tension arm is at the center position. Obviously, the nulled voltage could be other than zero volts. It may be seen that coarse offset adjustments are made in the circuit by changing resistor values, and fine adjustments are made by adjusting variable resistors.

Obviously, although the present Hall Effect transducer is described herein in conjunction with a tape tension arm apparatus in a videotape recorder, it may readily be used in other electronic or mechanical apparatus wherein it is desirable to determine precisely the angular position of a rotatable shaft, disc or other equivalent member.

As previously mentioned, the present Hall Effect transducer further may be used in applications where greater angular rotations of a shaft or member, are to be sensed. For example, the transducer may be used as a tachometer for identifying the rotational velocity of a shaft through continuous 360° rotation, as well as the angular position of the shaft. As a tachometer, a single pole pair magnet configuration provides a full sinewave of output voltage per revolution, while a dual pole pair magnet configuration provides two full sinewaves of output voltage per revolution. However, for additional resolution, a large plurality of evenly spaced magnetic poles may be induced in the ring magnet to provide a corresponding large number of full sinewaves per revolution.

Although the invention combination has been described herein utilizing Hall Effect devices, it is to be understood that the invention contemplates the use of electro-magnetic transducing devices, of the type which are capable of sensing a change in the polarization of a magnetic field, and of supplying a voltage indicative of the change. In addition, the Hall Effect device may be replaced by a magneto-resistive transducing device, wherein a change in the polarization of a magnetic field relative to the device causes a resistance change which, in turn, is represented by a voltage at the output of the associated circuit such as that of FIG. 13. Thus the invention contemplates the use of various magnetic field transducers, various positions at which the transducers are secured, various magnet configurations and corresponding magnetic field patterns, and circuitry other than described herein by way of description.

What is claimed is:

1. Apparatus for sensing the angular position of a shaft of a tension arm supported by a housing for rotation through a preselected angle of less than 360° comprising;

a circular magnet of selected circumference having a pair of north-south magnetic poles selectively induced therein for generating an arcuate magnetic field thereabout, the magnet being coaxially secured for rotation with the tension arm through the preselected angle of less than 360°;

magnetic field transducing means selectively secured to the housing in close and constant proximity to the circumference of the circular magnet, and at a preselected position in the magnetic field between the north-south magnetic poles corresponding to a preselected center angular position of the tension arm; and circuit means including offset adjusting amplifier means responsive to the magnetic field transducing means for supplying a preselected null voltage when the tension arm is at the preselected center angular position, and a linearly varying voltage indicative of the degree of rotation of the tension arm within said preselected angle of less than 360° when the arm is angularly displaced from the preselected center angular position.

2. The apparatus of claim 1 including:

bearing means for rotatably supporting the shaft of the tension arm within the housing;

said circular magnet being secured to the shaft within one end of the housing;

said circuit means including a circuit board secured to the end of the housing adjacent the circular magnet; and said magnetic field transducing means being secured to the circuit board to maintain the transducing means in said preselected position in the magnetic field.

3. The apparatus of claim 2 wherein:

the magnetic field transducing means is a Hall Effect device;

the circuit means includes positive and negative regulated voltage sources coupled to the Hall Effect device; and potentiometer means coupled to the offset adjusting means for setting the preselected null voltage to zero when the tension arm is at the preselected position.

4. Apparatus for sensing the angular position within a preselected angle of a rotatable member supported by a housing, the apparatus having annular magnet means coaxially secured for rotation with the rotatable member and including a magnetic pole pair for generating a magnetic field of corresponding arcuate length about the magnet means, comprising:

magnetic field transducing means including a Hall Effect device secured in close and constant proximity to a given surface of the magnet means to provide a constant gap therebetween, said Hall Effect device being selectively disposed within the magnetic field between adjacent magnetic poles thereof when the rotatable member is at a preselected angular position;

said Hall Effect device further being disposed in a magnetic null region between the magnetic poles of the magnetic field in angular coincidence with the preselected angular position of the rotatable member;

circuit means including offset adjusting means coupled to the magnetic field transducing means for generating a substantially linear range of voltages indicative of corresponding angular deviations of the tension arm from the preselected annular position; and said offset adjusting means being set at a preselected nulled voltage corresponding to a zero point in the slope in the linear range of voltage when the rotatable member is at the preselected angular position.

5. The apparatus of claim 4 wherein:

the magnet means includes a ring magnet having dual magnetic pole pairs for generating dual north-south magnetic fields along a plane generally perpendicular to the axis of the rotatable member; and the Hall Effect device generally is secured within the plane and between one pair of the adjacent magnetic poles when the rotatable member is at the preselected angular position.

6. The apparatus of claim 4 wherein:

the north-south poles are induced within the magnet means at respective radii thereof which do not coincide with a common diameter thereof, to define the magnetic field arcuate length over more than half of the circumference of the magnet means; and the Hall Effect device is secured in close and constant proximity to the magnet means substantially at a magnetic null of the magnetic field.

7. The apparatus of claim 4 wherein the circuit means includes:

means for supplying a selected operating voltage to the Hall Effect device; and said offset adjusting means includes an offset operational amplifier coupled to the Hall Effect device for supplying the preselected nulled voltage when the rotatable member is at the preselected angular position.

8. The apparatus of claim 7 wherein:

the means for supplying comprises positive and negative regulated voltage sources;

the offset operational amplifier is set at a preselected nulled voltage of zero volts; and the circuit means fruther includes an amplifying means coupled to the offset operational amplifier.

9. The apparatus of claim 4 wherein the Hall Effect device is disposed within the magnetic field in a region thereof which is displaced from the magnetic null generated by the magnetic field when the rotatable member is at said preselected angular position.

10. Apparatus for sensing the angular position of a rotatable member supported by a housing, comprising:
- magnet means of preselected annular length, coaxially secured for rotation with the rotatable member and having a magnetic pole pair for generating a magnetic field of corresponding arcuate length about the magnet means;
- wherein the magnet means includes a ring magnet having a selected portion removed from the cross section thereof to define confronting ends of the ring magnet;
- magnetic field transducing means secured in constant proximity to a given surface of the magnet means at a preselected location within the arcuate length of the magnetic field when the rotatable member is at a preselected angular position;
- wherein the magnetic field transducing means is a Hall Effect device secured in close and constant proximity relative to the magnet means to provide a constant gap therebetween, said Hall Effect device being selectively disposed within the magnetic field between adjacent magnetic poles thereof and disposed in the close and constant proximity to the ring magnet in diametrically opposed relation to the selected removed portion when the rotatable member is at the preselected angular position; and
- circuit means including offset adjusting means coupled to the magnetic field transducing means for generating a substantially linear range of voltages indicative of corresponding angular positions of the rotatable member; and
- wherein the offset adjusting means is set at a preselected nulled voltage when the rotatable member is at the preselected angular position.

* * * * *